July 31, 1956 A. J. RADCLIFFE, JR 2,757,246

COMPRESSOR-EXPANDER VOLUME-RANGE CONTROL DEVICE

Filed May 27, 1952

INVENTOR:
ARTHUR J. RADCLIFFE, JR.
BY John J. Bellamy
ATTORNEY

United States Patent Office 2,757,246 Patented July 31, 1956

2,757,246

COMPRESSOR-EXPANDER VOLUME-RANGE CONTROL DEVICE

Arthur J. Radcliffe, Jr., La Grange, Ill., assignor to International Telephone and Telegraph Corporation, a corporation of Maryland Application May 27, 1952, Serial No. 290,166

1 Claim. (Cl. 179—171)

This invention relates to a volume-range control device, and the main object is to provide a simple and reliable device of the stated character which is suitable for use in a telephone system to reduce crosstalk between adjacent lines, and to otherwise improve the signal-to-noise ratio, by rendering the signal level of transmission lines comparatively uniform.

A further object is to provide a device having a simple circuit configuration which is readily adaptable to provide either a volume compressor or a volume expander, as desired.

One feature of the invention resides in the use, in a triode amplifier, as an unbypassed self-biasing cathode resistor, of an element having the characteristic that its resistance changes substantially with a change of current flow therethrough, whereby the amplifier can be adjusted to any desired point between (for example) highly degenerative de-amplification and substantial amplification, by varying the average cathode-anode current therethrough.

A related feature resides in the use of an input-associated rectifier and a controlled filter to alter the average control-grid bias of the amplifier, and consequently the average cathode-anode current, according to the varying average level of the signal at the input of the amplifier.

Other objects and features of the invention will appear as the description progresses with reference to the accompanying drawings, comprising Figures 1 to 4.

While the invention is equally applicable to carrier channels, over which the voice-current signals of a channel are represented by a band of frequencies above voice frequency, it has been chosen for simplicity to illustrate the invention as applied to a group of voice-frequency telephone lines. It is therefore assumed that the apparatus of Figs. 1 to 4 carries voice-frequency telephone currents.

Figure 1:
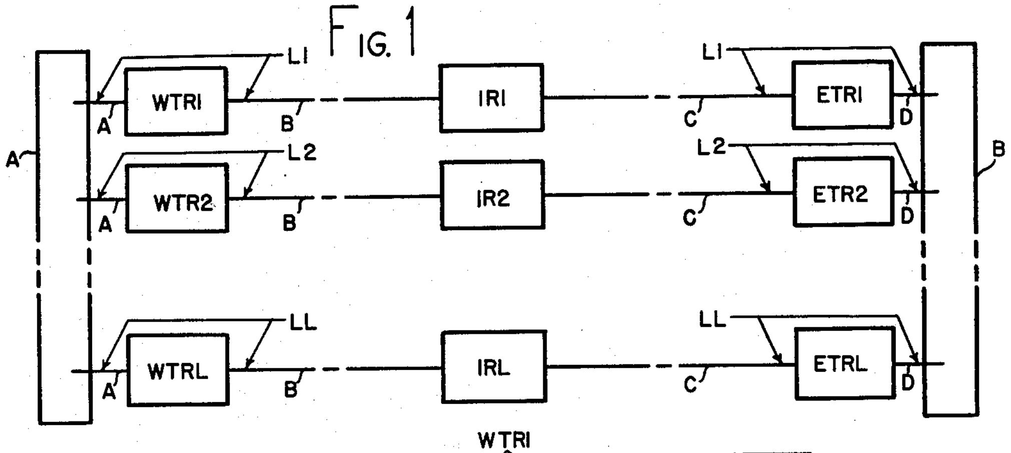
Fig. 1 shows a number of two-way telephone trunk lines (or long-distance lines) interconnecting two locations and provided with repeaters to compensate for transmission losses.

*Figure 1*

Lines L1 to LL of Fig. 1 represent an indefinite number of lines, or two-way voice-frequency channels, interconnecting a telephone switchboard at location A with a telephone switchboard at the distant location B. The distance from A to B is assumed to be great enough that each line requires two terminal repeaters and at least one intermediate repeater to compensate in the usual manner for transmission losses. As will hereinafter appear, the volume-control apparatus of the invention is associated with the respective terminal repeaters.

Considering line L1, its repeaters are the west terminal repeaters WTR1, the east terminal repeater ETR1, and the intermediate repeater IR1. For longer lines, additional intermediate repeaters are used, as required.

The remaining lines of the group, L2 to LL, are similarly provided with repeaters, comprising (1) west terminal repeaters WTR2 to WTRL, (2) intermediate repeaters IR2 to IRL, and (3) east terminal repeaters ETR2 to ETRL.

One practical limitation on the distance over which telephone conversations can be satisfactorily carried out with lines of a given type of construction is imposed by unwanted foreign currents which find their way into the talking path, as by so-called cross talk from other lines of the group, induction from power lines, and the like. The foreign currents, or signals, are referred to as noise. It is desirable to maintain a high signal-to-noise ratio in each line. The signal-to-noise ratio is obviously better for a high signal level than for a low one, but the maximum signal level permissible on a given line is determined according to the corresponding increased tendency for a high signal level thereon to cause cross-talk signals in adjacent lines. The ideal condition, therefore, for a group of mutually adjacent lines or talking channels (as in Fig. 1), is realized when each line employs approximately the same relatively high signal level at all times, irrespective of the input level, which varies from speaker to speaker, and often from word-to-word, or from syllable-to-syllable, of the same speaker. According to the invention, this ideal condition is approached by employing a volume-compressor at each of the terminal repeaters (such as WTR1 and WTR2) of Fig. 1 so arranged, in combination with a relatively high-gain amplifier, that minimum-level signals incoming to the transmission line are repeated as high-level signals having a reference volume level definitely short of, but comparatively near to, the upper signal-level limit set for the group of lines. The volume compressor is arranged to lower the normally high overall amplification factor progressively as the input level rises, to the end that signals of increased input level are amplified to a lesser degree, and are thus repeated at output levels which approach the noted upper limit level, but do not quite reach it even when the input level is at a maximum.

By way of example, the input signal voltage may range between a given nominal minimum and a given nominal maximum which is one hundred times as great. With the volume-control device of the invention used as a volume compressor, output signal variations may be compressed to the extent that the output signal voltage resulting from an input signal of the noted nominal maximum level is only ten times (rather than one hundred times) as great as the output signal voltage resulting from an input signal of the noted nominal minimum level. That is to say, the voltage variations beyond the volume compressor may be only one tenth as great as the incoming voltage variations. This compression in volume range, by causing the low-volume signals to have more nearly the volume of the high-volume signals, tends to keep all signals well above the noise level.

The volume-compressed signals transmitted over any line of Fig. 1 must be volume-expanded at the distant output terminal repeater to substantially restore the original volume range, in order that the intelligibility of the ultimately received voice signals be substantially unimpaired.

For line L1, for example, signals west-to-east are volume-compressed at repeater WTR1, and are correspondingly volume-expanded at repeater ETR1. Signals east-to-west over line L1 are volume compressed at ETR1, and volume-expanded at WTR1.

For convenience, the line sections into which the lines of Fig. 1 are divided by the illustrated repeaters are labeled A, B, C, and D for each line. Considering line L1, for example, repeater WTR1 is between sections L1–A and L1–B; repeater IR1 is between sections L1–B and L1–C; and repeater ETR1 is between sections L1–C and L1–D.

Figure 2:
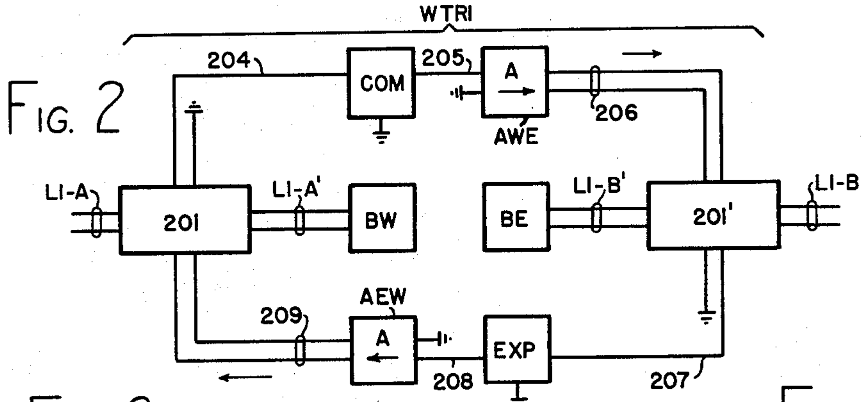
Fig. 2 shows in block diagram the two-way terminal repeater WTR1 of Fig. 1 incorporating volume-control apparatus COM and EXP according to the invention.

*Figure 2*

In Fig. 2, the west terminal repeater WTR1, shown in Fig. 1 as a rectangle, is shown in block circuit diagram, with its several principal components separately indicated as respective rectangles.

The principal components of the west terminal repeater WTR1 and their interconnections are; (1) the hybrid coil 201 between the two wire line section L1–A (represented diagrammatically in Fig. 1 as a single conductor) and the two wire connection L1–A′, connecting the usual artificial balance line BW to the hybrid coil 201; (2) the volume compression device COM (related directly to the invention) connected to the hybrid coil 201 by the ground-return path over conductor 204; (3) the west-to-east amplified AWE, supplied over the single input conductor 205, and connected by output conductors 206 to the east hybrid coil 201′; (4) the hybrid coil 201′ and associated east balance line BE; (5) the volume-expansion device EXP (directly related to this invention); and (6) east-to-west amplifier AEW. The path through the above items (1) to (3) is termed the west-to-east channel, while the oppositedly directed path through the above items (4) to (6) is termed the east-to-west channel.

West-to-east voice-signal currents reaching the repeater WTR1 over line section L1–A, from the switchboard at location A (Fig. 1) pass through the hybrid coil 201 (Fig. 2) and over section L1–A′ to balance line BW. Any resultant energy passing over the conductors 209 is without effect because of the one-way action of amplifier AEW.

The resultant signal energy passing over conductor 204 is received by the volume-compression device COM, which compresses the signal volume as previously indicated. The volume compressed signals pass over conductor 205 to the amplifier AWE for amplification as desired and pass thence over conductors 206 to the hybrid coil 201′. Signal energy thus reaching hybrid coil 201′, reaches both the artificial balancing line BE and the conductors of line section L1–B for transmission to the distant end of the line, these signals being restored to original volume range by volume-expansion in repeater ETR1, as will be pointed out hereinafter for east-to-west signals handled by repeater WTR1.

Volume-compressed east-to-west voice-current signals received at repeater WTR1 over line section L1–B (having been volume compressed at repeater ETR1) pass through hybrid coil 201′ and over line section L1–B′ to balance line BE. The useful portion of these signals is transferred over conductor 207 to the volume-expansion device EXP, whereat the original volume-compression is substantially undone, to restore the signals to substantially their original volume range. From device EXP, the volume-expanded signals pass over conductor 208 to amplifier AEW, whereat they are amplified as desired, and pass thence, over conductor 209, to hybrid coil 201. The signals thus reaching this coil divide between line section L1–A and balance line BW, but the usual balance action substantially prohibits a resultant return flow over conductor 204.

The signal currents thus transferred to line section L1–A pass through the switchboard at location A (Fig. 1).

Figure 3:
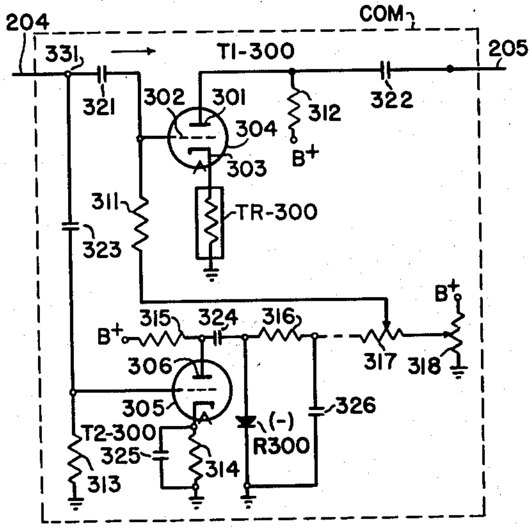
Figs. 3 and 4 are circuit diagrams of the respective control devices COM and EXP of Fig. 2.

*Figure 3*

Figure 3 is a circuit diagram of the preferred form of the volume compression device COM of Fig. 2. Device COM includes two triode amplifiers, T1–300 and T2–300, having a common input terminal 331, which is the output terminal of conductor 204, Fig. 2. T1–300 is the main amplifier and T2–300 is an auxiliary bias-control amplifier.

The amplifier T1–300 includes the triode tube 304, input-coupling condenser 321, grid-leak resistor 311 (connected to the common ground through potentiometer 317 and the positive bias control potentiometer 318), load resistor 312 between the plate 301 and the positive supply source, output-coupling condenser 322, and unbypassed self-biasing cathode resistor TR–300. The specific volume-range control arrangement according to this invention requires the resistor TR–300 to have the characteristc that its resistance varies with the value of current flow therethrough. By way of example, resistor TR–300 may comprise a so-called "Thyrite" resistor such as item No 8,399,401 G1, manufactured by General Electric Company, Schenectady, N. Y. The resistance of such a resistor changes inversely with a change of current substantially as given in the following table:

| Current in microamperes: | Resistance in ohms |
|---|---|
| 4 | 500,000 |
| 40 | 125,000 |
| 400 | 25,000 |
| 4000 | 5,000 |

As the cathode resistor TR–300 is unbypassed, the overall amplification of amplifier T1–300 varies inversely with the resistance of this resistor. This inverse variation results from the well-understood degenerative action of an unbypassed cathode resistor. If the degenerative factor is less than the amplification factor of the tube 304 (as when the cathode resistance is low), there is a net corresponding signal amplification, but there is a signal deamplification when the degenerative factor is greater than the amplification factor, as when the cathode resistance is high.

For the above-indicated resistor at TR–300; the tube 304 may be one half of a commercial dual triode 12AX7, having an amplification factor of 100; the plate supply voltage may be 200 volts; and the auxiliary amplifier T2–300 may be arranged to vary the average bias on grid 302 over a range of several volts, extending between a relatively positive normal point which is positive with respect to ground and a relatively negative high-signal point which is negative with respect to ground.

In order to minimize distortion from unequal amplification of successive half cycles of signal voltage, the signal input to the compressor COM (by hybrid coil 201, Fig. 2, over conductor 204) should be substantially less than one volt maximum, to the end that it is small compared to the noted control range of voltage variation of grid 302.

With no signal voltage incoming to device COM (Fig. 3) the normal-bias potentiometer 318 is adjusted to provide the normal positive bias on grid 302 necessary to result in a bias between grid 302 and cathode 303 for the desired normal cathode-anode current flow, through resistors 312 and TR–300.

The auxiliary, bias-control amplifier T2–300 is arranged to provide straight-forward amplification, and includes triode 305, input-coupling condenser 323, grid-leak resistor 313, self-biasing cathode resistor 314 (bypassed by condenser 325), load resistor 315 between the plate 306 and the positive supply source, and coupling condenser 324.

The output of amplifier T2–300 (being the amplified version of signals received over the common input conductor 204) is negative rectified, filtered, and impressed across the potentiometer 317, whereat the summation of this negative potential and the normal positive bias potential is applied to the control grid 302 of triode 304, through grid-lead resistor 311. For this purpose the output is passed through coupling condenser 324, to ground through rectifier R–300, poled as to allow a build up of negative potential on its ungrounded element. The filter circuit includes at least one section comprising a series resistor 316, and a shunt condenser 326. As many such sections may be included as desired for the purpose at hand.

Normally, a relatively large cathode-anode current flows through tube 304 as a result of the described normal bias on grid 302. Consequently, the resistance of TR–300 is normally at a minimum as a result of the large normal current flow therethrough. Under this condition, the degenerative factor is at a minimum. Therefore, a low-volume signal incoming to device COM receives substantial amplification by main amplifier T1–300, as the auxiliary amplifier T2–300 then makes only a small change in the average bias of grid 304.

For progressively higher input volume levels, the overall amplification of main amplifier T1–300 is progressively decreased as a result of the progressive increase of the resistance of resistor TR–300, which in turn results from the decreased cathode-anode current resulting from the increased negative potential supplied by T2–300 to the left hand terminal of potentiometer 317.

A signal approaching the maximum input volume level may undergo substantial deamplification (rather than amplification) as a result of the high average resistance value then imposed on resistor TR–300 by the low cathode-anode current through 304 then resulting from the high negative output to grid 302 by T2–300 and potentiometer 317.

In practice, the potentiometer 318 is adjusted to give the bias on the grid 302 which will provide the desired maximum gain for a very low volume of input signal, and the potentiometer 317 is adjusted to provide the desired minimum gain for maximum volume of input signal.

Figure 4:
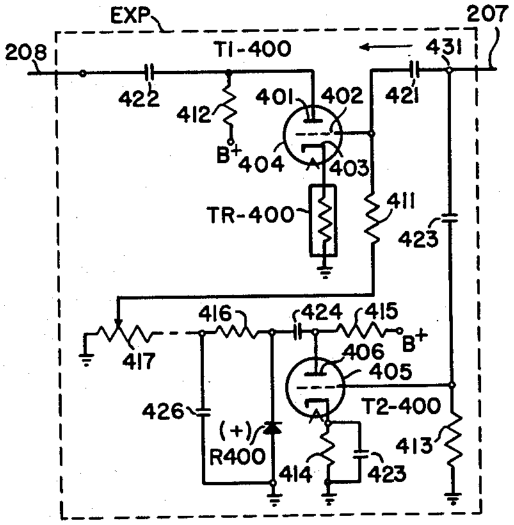

*Figure 4*

Figure 4 is a circuit diagram of the preferred form of the volume-expansion device EXP of Fig. 2 interposed between input and output conductors 207 and 208. Except for being reversed in right-left direction of signal travel, the device of Fig. 4 is similar to Fig. 3 and except for the reversed poling of rectifier R–400 and the absence of a positive-bias potentiometer such as 318 of Fig. 3. The parts in Fig. 4 are given reference characters similar to the corresponding parts of Fig. 3, but in the 400 series of numbers.

The voice-signal currents incoming to Fig. 4, over conductor 207, are of compressed volume-range, the volume compressing action having taken place in the east terminal repeater ETR1 of Fig. 1 as previously described for Fig. 3. The required restorative, volume-expanding action thus entails a relatively low net amplification of low-volume signals received over conductor 207, and a relatively high net amplification of the high-volume input signals, the required action being substantially the reverse of the device of Fig. 3. Consequently, the left hand terminal of potentiometer 417 is grounded, to provide a ground potential bias on control grid 402.

The self-biasing action of cathode resistor TR–400 thus renders the cathode positive with respect to the control grid, thereby reducing the cathode-anode current to a normal minimum, with a consequent normal maximum resistance at TR–400. A maximum degenerative action (owing to the action of the unbypassed resistor TR–400) thus occurs for input signals of very low volume.

For input signals of higher volume, the substantial value of the positive-rectified (R–400) output of amplifier T2–400, filtered by parts 416 and 426, reaches grid 402 through potentiometer 417, thereby rendering the average potential on grid 402 more positive, thus increasing the average cathode-anode current. The resistance of TR–400 is thereby correspondingly decreased, whereby the associated degenerative effect is lessened.

Potentiometer 417 is set to provide, for an input signal of predetermined high volume, the desired increase of net amplification over that obtained for input signals of very low volume, to the end that volume expansion thus accomplished restores the signals to substantially the volume range they had on entering the transmission line in question.

I claim:

In a volume-range control device for use in a system wherein communication signals of the class including telephone voice currents are transmitted over transmission lines, an input circuit path, an output circuit path, an electronic repeating device interposed between said paths and including circuit means for repeating signals in the output path according to signals received over the input path, said electronic repeating device including an electronic amplifier device having a cathode and an anode, and having a control electrode for controlling the flow of current between cathode and anode, a cathode resistor, said input circuit path leading to said control electrode and including said cathode and cathode resistor in series, a direct-current conductive output power circuit including a source of direct current, said anode, cathode, and cathode resistor in series, means coupling said output circuit path to said power circuit, said cathode resistor being unbypassed to provide an amount of signal degeneration which depends upon the resistance of the cathode resistor, said cathode resistor having the characteristic that its resistance depends upon the amount of current momentarily flowing therethrough, whereby the amount of signal degeneration at any moment depends on the momentary average value of direct-current flow through the anode, cathode, and cathode resistor in series, and control means for controlling the average momentary value of said direct-current flow, and for consequently controlling the amount of degeneration and resulting gain, said control means including means controlled from the input circuit path in parallel with the input to the said electronic amplifier for applying a direct-current bias potential to said control electrode and for regulating its average momentary value according to the input signal volume.

References Cited in the file of this patent

UNITED STATES PATENTS

| | | |
|---|---|---|
| 1,869,331 | Ballantyne | July 26, 1932 |
| 2,182,329 | Wheeler | Dec. 5, 1939 |
| 2,313,096 | Shepard | Mar. 9, 1943 |
| 2,375,283 | Cloud | May 8, 1945 |
| 2,548,901 | Moe | Apr. 17, 1951 |
| 2,572,108 | Chalhoub | Oct. 23, 1951 |